US009603074B2

(12) United States Patent
Balakrishnan et al.

(10) Patent No.: US 9,603,074 B2
(45) Date of Patent: Mar. 21, 2017

(54) SYSTEMS AND METHODS FOR CARRIER CHANNEL SELECTION IN CARRIER AGGREGATION ENABLED NETWORKS

(71) Applicant: APPLE INC., Cupertino, CA (US)

(72) Inventors: Swaminathan Balakrishnan, Sunnyvale, CA (US); Samy Khay-Ibbat, San Francisco, CA (US); Sarma V. Vangala, San Jose, CA (US); Tarik Tabet, Los Gatos, CA (US); Rafael L. Rivera-Barreto, Santa Clara, CA (US); Sree Ram Kodali, Sunnyvale, CA (US); Sai Sravan Bharadwaj Karri, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 35 days.

(21) Appl. No.: 14/503,220

(22) Filed: Sep. 30, 2014

(65) Prior Publication Data
US 2015/0172987 A1 Jun. 18, 2015

Related U.S. Application Data

(60) Provisional application No. 61/916,658, filed on Dec. 16, 2013.

(51) Int. Cl.
*H04L 5/00* (2006.01)
*H04W 36/00* (2009.01)
(Continued)

(52) U.S. Cl.
CPC ............ *H04W 36/24* (2013.01); *H04L 5/001* (2013.01); *H04L 5/0035* (2013.01); *H04W 36/0088* (2013.01); *H04W 36/06* (2013.01)

(58) Field of Classification Search
CPC .... H04L 5/001; H04W 52/365; H04W 56/00; H04W 76/046; H04W 36/24; H04W 36/06; H04W 36/0088; H04B 17/327
See application file for complete search history.

(56) References Cited

U.S. PATENT DOCUMENTS 8,917,593 B2 * 12/2014 Damnjanovic ... H04W 56/0045
370/228
9,125,174 B2 * 9/2015 Wu ..................... H04W 72/005
(Continued)

FOREIGN PATENT DOCUMENTS

WO 2010/105254 9/2010
WO 2011/099799 8/2011

*Primary Examiner* — Ayaz Sheikh
*Assistant Examiner* — Debebe Asefa
(74) *Attorney, Agent, or Firm* — Fay Kaplun & Marcin, LLP (57) ABSTRACT

A user equipment (UE) configured to connect to a network and operate in a carrier aggregation mode and a single carrier mode performs methods to select optimal component carriers. The methods include determining that a primary component carrier is operating less optimally than a secondary component carrier, sending an indication to the network that the primary component carrier is operating less optimally than the secondary component carrier, acquiring the secondary component carrier as a target primary component carrier and operating with the secondary component carrier as the target primary carrier component. In one exemplary embodiment, the indication is declaring a radio link failure ("RLF") between the UE and the network. In another exemplary embodiment, the indication is a measurement report send to the network that triggers a handover procedure for the UE.

20 Claims, 5 Drawing Sheets

(51) Int. Cl.
*H04W 36/06* (2009.01)
*H04W 36/24* (2009.01)

(56) References Cited

U.S. PATENT DOCUMENTS

| | | | |
|---|---|---|---|
| 9,185,697 B2* | 11/2015 | Kuchibhotla et al. | |
| 9,232,418 B2* | 1/2016 | Lindoff | H04W 24/04 |
| 9,236,986 B2* | 1/2016 | Park | H04L 5/00 |
| 2012/0014357 A1 | 1/2012 | Jung et al. | |
| 2014/0348105 A1* | 11/2014 | Rosa et al. | 370/329 |

* cited by examiner

SYSTEMS AND METHODS FOR CARRIER CHANNEL SELECTION IN CARRIER AGGREGATION ENABLED NETWORKS

PRIORITY CLAIM/INCORPORATION BY REFERENCE

This application claims priority to U.S. Provisional Application 61/916,658 entitled "Systems and Methods for Carrier Channel Selection in Carrier Aggregation Enabled Networks," filed on Dec. 16, 2013, the entirety of which is incorporated herein by reference.

BACKGROUND

Long-term evolution ("LTE") is a wireless communication standard used for high-speed data for mobile devices and data terminals. LTE-Advanced is a major enhancement to the LTE standard. Within the LTE-Advanced standard, carrier aggregation is used to increase the bandwidth, and thereby increase the bitrates. Carrier aggregation has been introduced in the 3rd Generation Partnership Project ("3GPP") Release 10 (LTE-Advanced standard) to provide wider than 20 MHz transmission bandwidth to a single device (e.g., user equipment or "UE") while maintaining the backward compatibility with legacy UEs. Specifically, carrier aggregation may be defined as the aggregation of two or more component carriers in order to support wider transmission bandwidths. Carrier aggregation configuration may be defined as a combination of carrier aggregation operating bands, each supporting a carrier aggregation bandwidth class by a UE. The bandwidth class may be defined by the aggregated transmission bandwidth configuration and maximum number of component carriers supported by a UE.

For intra-band contiguous carrier aggregation, a carrier configuration may be a single operating band supporting a carrier aggregation bandwidth class. For each carrier aggregation configuration, requirements may be specified for all bandwidth combinations contained within a bandwidth combination set, as indicated by the radio access capabilities of the UE. Accordingly, a UE may indicate support of several bandwidth combination sets for each band combination.

Figure 1:
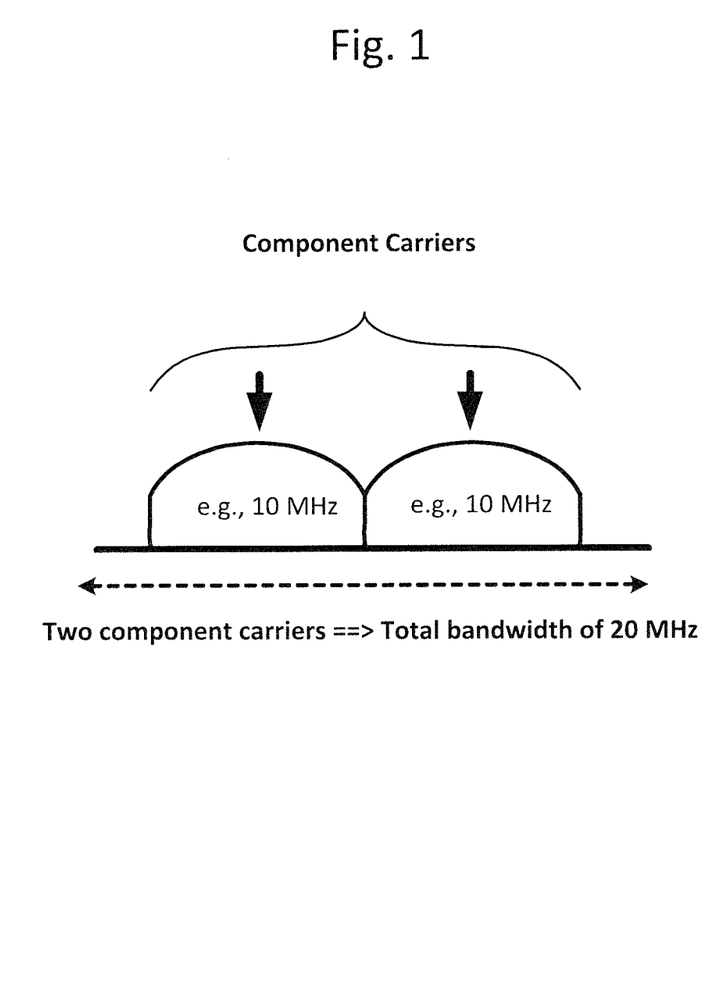
FIG. 1 (discussed above) shows an example of carrier aggregation including two component carriers each having a bandwidth of 10 MHz for a total bandwidth of 20 MHz.

Under the current standards, each aggregated carrier is referred to as a component carrier, and each component carrier can have a bandwidth of 1.4, 3, 5, 10, 15 or 20 MHz and a maximum of five component carriers can be aggregated. As illustrated in FIG. 1, two exemplary component carriers may each have a bandwidth of 10 MHz to combine for a total bandwidth of 20 MHz. With carrier aggregation features enabled, the LTE-Advanced standard device supporting 20 MHz carrier aggregation may achieve downlink throughput of 100 Mbps in the application layer.

SUMMARY

Described herein are systems and methods for carrier channel selection in carrier aggregation enabled networks. A method is performed by a user equipment (UE) that utilizes a plurality of component components including a primary component carrier and a secondary component carrier. The method may include detecting an imbalance on a primary component carrier over the secondary component carrier, wherein the imbalance indicates the secondary component carrier is operating more optimally than the primary component carrier, declaring a radio link failure ("RLF") between the UE and a network provider, including dropping a radio resource control ("RRC") connection between the UE and the network provider, acquiring the secondary component carrier as a target primary component carrier, reestablishing with the network provider via the RRC connection, and operating with the secondary component carrier as the target primary carrier component.

Further described herein is a UE including a transceiver and a processor. The transceiver is configured to connect to a network and operate in a carrier aggregation mode and a single carrier mode. The processor is processor coupled to a memory and executes an executable program stored on the memory, wherein the execution of the program causes the processor to perform operations including determining that a primary component carrier is operating less optimally than a secondary component carrier, sending an indication to the network that the primary component carrier is operating less optimally than the secondary component carrier, acquiring the secondary component carrier as a target primary component carrier and operating with the secondary component carrier as the target primary carrier component.

Further described herein is a method performed by a UE that utilizes a plurality of component carriers including a primary component carrier and a secondary component carrier. The method including determining that a primary component carrier is operating less optimally than a secondary component carrier, sending a measurement report to a network provider, wherein the measurement report indicates the primary component carrier is operating less optimally than the secondary component carrier and the measurement report triggers a handover procedure for the UE and performing handover procedure, wherein the handover procedure establishes the secondary component carrier as a target primary component carrier.

DETAILED DESCRIPTION

The exemplary embodiments may be further understood with reference to the following description and the appended drawings, wherein like elements are referred to with the same reference numerals. The exemplary embodiments relate to systems and methods for carrier channel selection in carrier aggregation enabled networks. Specifically, the exemplary systems and methods use measurements that are made by the UR concerning the carrier aggregation channels being used by the UE to determine whether a more favorable primary cell in a carrier aggregation enabled network is available for the UE.

Figure 2:
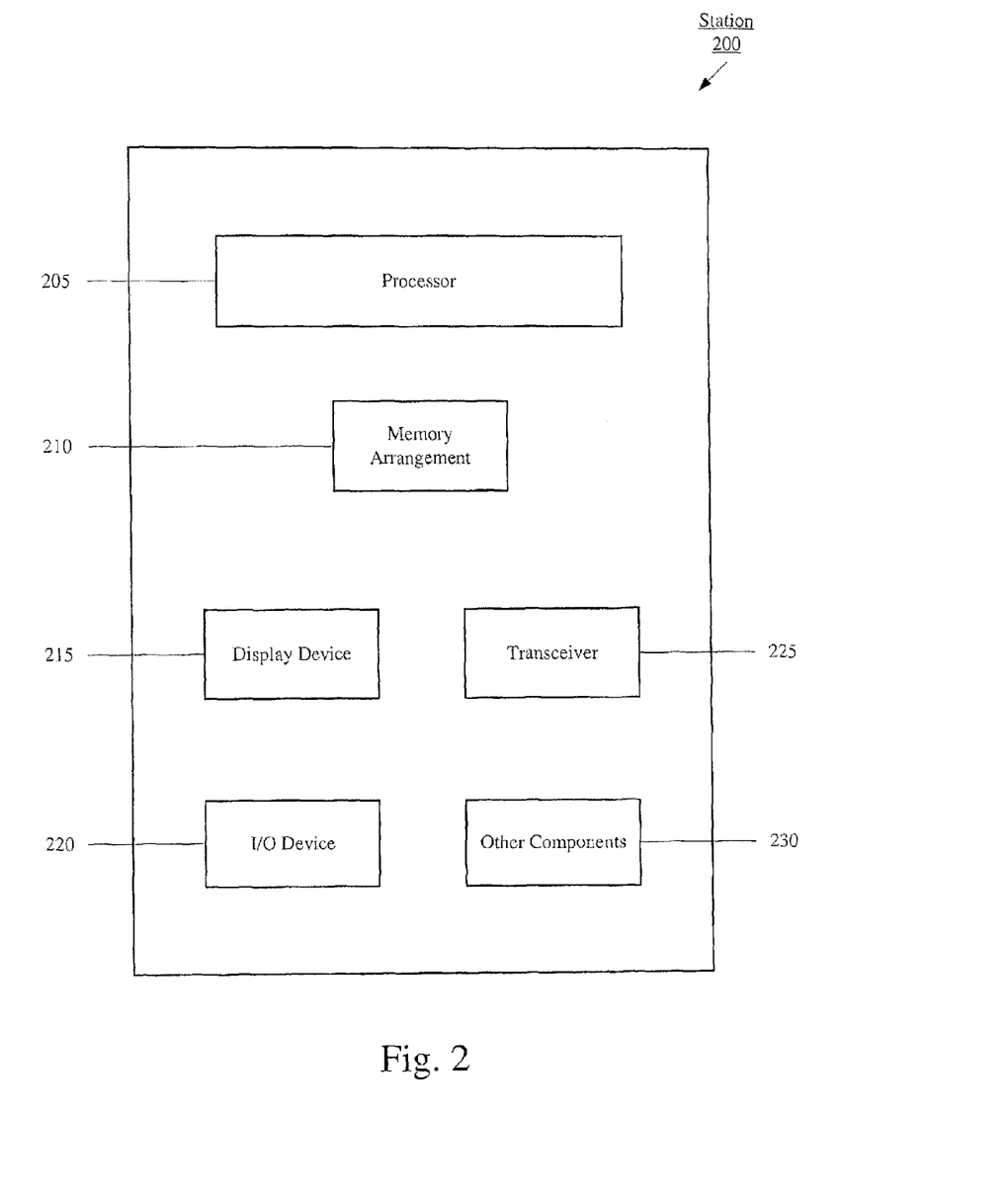
FIG. 2 shows an exemplary user equipment (UE) that performs cell selection in a carrier aggregation mode.

FIG. 2 shows an exemplary user equipment (UE) 200 that performs cell selection in a carrier aggregation mode. The UE 200 may represent any electronic device that is configured to perform wireless functionalities, specifically carrier aggregation functionalities. For example, the UE 200 may be a portable device such as a phone, a smartphone, a tablet, a phablet, a laptop, etc. In another example, the UE 200 may be a stationary device such as a desktop terminal. The UE 200 may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the UE 200 to other electronic devices, etc.

The processor 205 may be configured to execute a plurality of applications of the station 200. For example, the applications may include a web browser when connected to a communication network via the transceiver 225. In a specific exemplary embodiment, the processor 205 may execute a carrier selection application. The UE 200 is capable of operating in a carrier aggregation mode. The carrier aggregation mode will be described in further detail below. The carrier selection application allows the UE 200 to determine if a current cell being used as a secondary cell for carrier aggregation for the UE 200 has better operating characteristics than a current cell being used as a primary cell for carrier aggregation for the UE 200. When the current secondary cell has better operating characteristics, the carrier selection application may switch the secondary cell to become the primary cell. The operation of switching the secondary cell to become the primary cell will be described in greater detail below.

The transceiver 225 may be a hardware component configured to transmit and/or receive data. That is, the transceiver 225 may enable communication with other electronic devices directly or indirectly through the network based upon the operating frequencies of the network. In carrier aggregation modes, the transceiver 225 allows the UE 200 to communicate with both the primary cell and the secondary cell.

It should be noted that the processor 205 performing the functionality described herein for the carrier selection application is only exemplary. For example, the transceiver 425 may also perform some or all of the functionality of the carrier selection application. In a further example, a separate integrated circuit that may or may not include firmware may perform the functionality of the carrier selection application.

Figure 3:
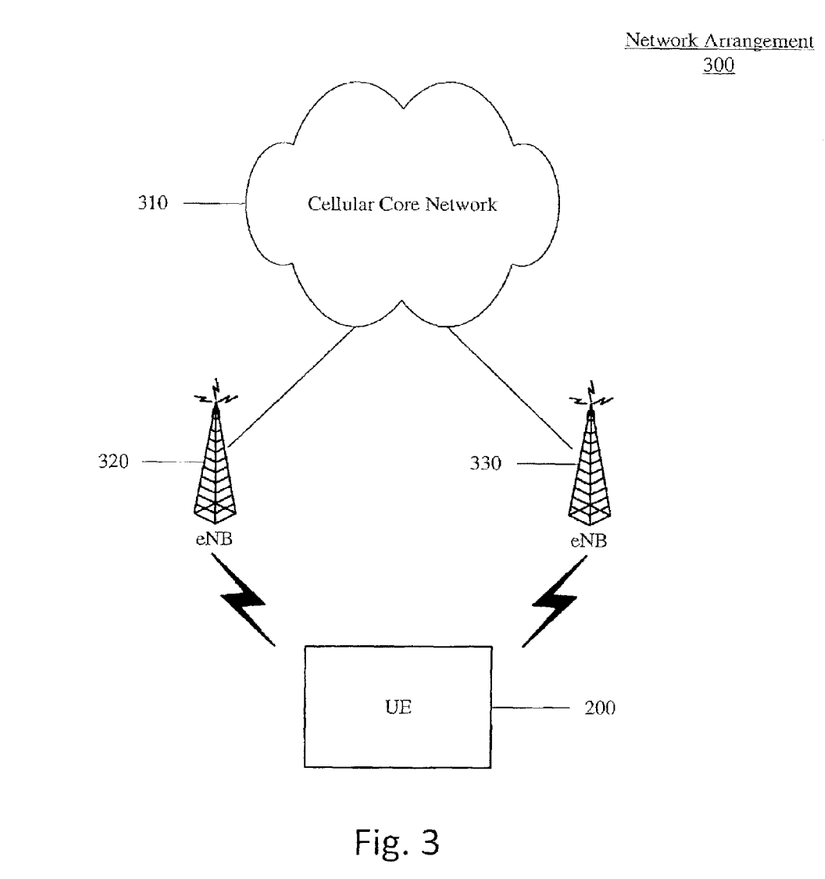
FIG. 3 shows an exemplary network arrangement that implements carrier aggregation functionality.

FIG. 3 shows an exemplary network arrangement 300 that implements carrier aggregation functionality. The network arrangement 300 includes a cellular core network 310 and two cells 320 and 330. In this example, it may be considered that the cells 320 and 330 are evolved Node B's (eNBs) as are deployed in Long Term Evolution (LTE) networks. The combination of the cellular core network 310 and the eNBs 320 and 330 allow the UE 200 to connect to the LTE network and communicate with other devices that are also connected either directly or indirectly to the LTE network. The cellular core network 310 and the eNBs 320 and 330 are provided by a network provider (e.g., AT&T, Verizon, T-Mobile, Sprint, etc.) and form part of the LTE network for that network provider. Those skilled in the art will understand that the network provider may deploy thousands of eNBs for an LTE network and the use of two eNBs is only for illustrative purposes. In addition, an LTE network may include many other devices (e.g., routers, servers, etc.) and systems/services (e.g., IP Multimedia Subsystem (IMS), etc.

When carrier aggregation is used, there may be a number of serving cells for each of the component carriers. In the example of FIG. 3, the eNB 320 may be one serving cell and the eNB 330 may be a second serving cell. The coverage of the serving cells may differ due to both component carrier frequencies and power planning, which is useful for heterogeneous network planning. A radio resource control ("RRC") connection is handled by one cell, namely the primary serving cell ("PCell"), served by the PCC for uplink ("UL") and downlink ("DL").

The other component carriers may be referred to as SCCs for UL and DL, serving the secondary serving cells ("SCells"). The SCCs are added and removed as required, while the PCC is changed at handover. Those skilled in the art will understand that the PCell and SCells are logical constructs allowing for the addition of SCells as needed. The PCell is the main cell that is used for all RRC signaling and control procedures, while the SCell is considered an augmentation to the PCell. As will be described in greater detail below, the exemplary systems and methods for carrier selection in carrier aggregation enabled networks may be used to select a cell that has better operating characteristics as the PCell.

The exemplary embodiments show systems and methods for carrier channel selection (e.g., PCC and SCC) in carrier aggregation enabled networks. More specifically, the exemplary embodiments described herein may enhance the performance of a UE if the target PCC is the current serving SCC, and furthermore the target SCC is the current serving PCC. For example, the eNB 320 may be the current PCC and the eNB 330 may be the current SCC. However, the UE 200 in measuring the operating characteristics of the eNBs 320 and 330 may determine that it would be better of the eNB 330 were the PCC and the eNB 320 were the SCC. For instance, the current serving PCC (e.g., eNB 320) may have a limited UL carrier along with an imbalance when compared to the current serving SCC (e.g., eNB 330).

As will be described in detail below, the imbalance within the PCC may be determined based on measurements at the UE, such as, but not limited to the reference signal received power ("RSRP"), the reference signal received quality ("RSRQ"), the channel quality indication ("CQI"), etc. When such an imbalance occurs, it would improve UE performance if the PCC and SCC were switched. There is no current mechanism for the network provider to affect such a switch.

While an exemplary UE is performing a data session using carrier aggregation (e.g., 2 DL carriers and 1 UL carrier), the UE may experience limited UL channel power in the PCC. For instance, the limited UL channel scenarios may be due to any number of reasons, such as, but not limited to, lower maximum transmission power limit ("MTPL") due to specific absorption rate ("SAR") requirements, radio frequency ("RF") scenarios, deep fades, etc. It may be noted that each carrier channel has different propagation characteristics based on a variety of factors, such as, device characteristics, environment, etc.

In these limited UL channel scenarios, it may be that PCC currently serving the UE could be inferior in the UL than the SCC currently serving the UE. This may be possible as both carriers may have independent fading and MTPL requirements. Accordingly, in such situations, it may be possible to enhance the performance of the UE if the responsibilities of a target PCC could be assigned to the currently serving SCC. Likewise, the responsibilities of a target SCC could be assigned to the currently serving PCC, or alternatively, any other carrier component. Within the conventional carrier aggregation schemes, a network would not allow for this switching between channels with an RRC reconfiguration message.

The exemplary UE 200 may address this limited UL issue in a number of manners. According to one exemplary embodiment, the UE 200 may declare a radio link failure ("RLF") to initiate the channel switch. One skilled in the art will understand that the UE 200 may declare an RLF for a variety of scenarios including, DL physical layer failure, random access problems, maximum radio link control ("RLC") retransmissions, handover failures, power headroom report ("PHR"), etc. According to a further exemplary embodiment, the UE 200 may trigger an inter-frequency handover procedure to initiate the channel switch. One skilled in the art will understand that handover procedures may be used to transition the UE 200 from a source node to a target node.

Figure 4:
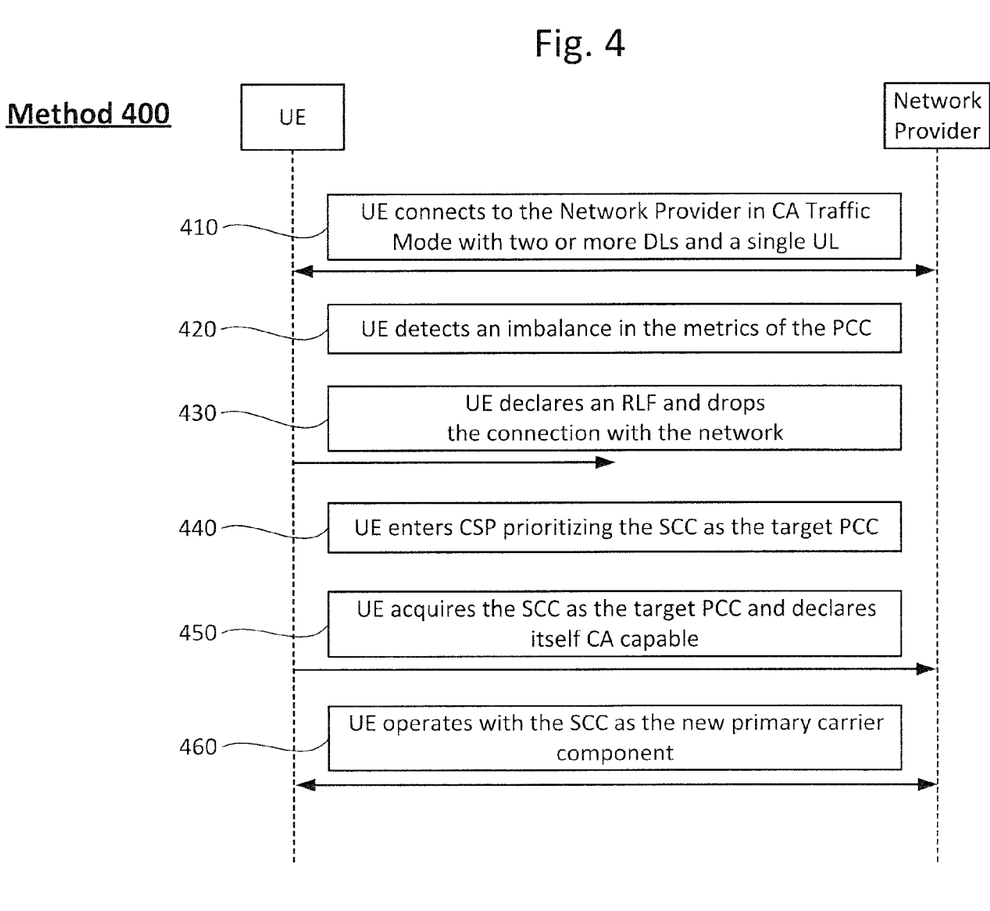
FIG. 4 shows an exemplary method for declaring an RLF to initiate the channel switch from a primary component carrier ("PCC") to a secondary component carrier ("SCC") according to an embodiment described herein.

FIG. 4 shows an exemplary method 400 for declaring an RLF to initiate the channel switch from the PCC to the SCC. It is noted that the entirety of the method 400 may be performed by the UE 200 that is capable of utilizing a plurality of carrier components with a network provider (e.g., as shown in network arrangement 300). The exemplary UE 200 may operate in either carrier aggregation mode for various band combinations, as well as in a single carrier mode using individual bands. Furthermore, the exemplary UE 200 may be aware of the MTPL in which it supports and may decide to switch operation between single carrier and carrier aggregation modes to enhance performance.

Accordingly, in step 410, the UE may be connected with the network provider in a carrier aggregation traffic mode with two or more DLs and a single UL. In this example, it will be considered that the UE 200 is connected to the eNBs 320 and 330 with the eNB 320 initially serving the PCC and the eNB 330 serving the SCC. In the diagram of FIG. 4 the communication exchange is shown between the UE 200 and the network provider. It should be understood that the network provider includes the eNBs 320 and 330 to which the connections are established. It should also be noted that since the PCC and SCC may be logical constructs, the PCC and the SCC may be included in the same physical eNB. However, for the purpose of illustrating the exemplary method 400, it will be considered that there are two separate eNBs serving the PCC and SCC, eNBs 320 and 330, respectively.

In step 420, the UE 200 may detect an imbalance in the metrics of the PCC when compared with metrics (e.g., operating characteristics) of the SCC. For instance, within the DL of the PCC, the UE 200 may detect the imbalance based on reported measurement data, such as, but not limited to RSRP, RSRQ, CQI, etc. Those skilled in the art will understand that the RSRP, RSRQ, CQI, etc. are measurements that are normally performed by the UE 200 on DL signals during the normal course of operation. In addition, the detection of an imbalance is not limited to these types of measurements. Accordingly, during step 420, the UE 200 may determine that the SCC is a better channel than the PCC (e.g., the SCC channel is operating more favorably or optimally than the PCC channel). Specifically, the UE 200 may determine that the measurement data at the SCC provides an improvement in channel quality over the measurement data at the PCC. Accordingly, the UE 200 may effectively prioritize the current SCC (served by the eNB 330) over the current PCC (served by the eNB 320).

In step 430, the UE 200 may declare an RLF and drop the connection (e.g., the RRC connection) with the network provider. As described above, in carrier aggregation, the RRC connection is maintained through the PCell. Thus, in this example, the UE 200 will drop the connection to the eNB 320 that is acting as the PCell. As noted above, the declaration of the RLF may be based on a number of retransmissions that have happened within a UL of the PCC and the duty cycle of the UE hitting the MTPL levels, the PHR report, etc.

In step 440, the UE 200 may enter into a cell selection process ("CSP") while prioritizing the SCC (e.g., the eNB 330) as the target PCC to the network provider. One skilled in the art will understand that CSP allows the UE 200 to select a suitable cell in which to camp on in order to access available services from the network provider.

In step 450, the UE 200 may acquire the previous SCC (served by eNB 330) as the target PCC and attempt to reestablish with the RRC as a UE capable of carrier aggregation. Specifically, the UE 200 may declare itself to the network provider as being capable of carrier aggregation. It should be noted that step 450 may be performed by the UE upon cell selection finding the same physical cell.

In step 460, the UE 200 may operate with the former SCC (served by eNB 330) as the new primary carrier component. Furthermore, the UE 200 may operate in either carrier aggregation mode or single carrier mode, depending upon the new RF conditions. That is, while the UE 200 has declared itself to be carrier aggregation capable, it does not necessarily mean that the UE 200 must operate in carrier aggregation mode. If the UE 200 is operated in carrier aggregation mode, the previous PCC (served by the eNB 320) may become the SCC.

According to the exemplary embodiments, the UE 200 may use radio link monitoring ("RLM") metrics, such as Qin/Qout, to trigger the RLF. Qin may be defined as a threshold for in synch operation, wherein the threshold is a level at which downlink radio quality may be significantly more reliably received than that at the out of sync threshold (e.g., Qout). Conversely, Qout may be defined as the out of synch threshold, wherein the threshold is the level at which the downlink radio link cannot be reliably received. Accordingly, the RLM monitoring may be based on the number of Qin and Qout results taken by a PHY layer entity and transmitted to higher layer entities. Thus, the UE 200 may signal the network that one or more of these metrics are not within an acceptable range, thereby triggering the RLF. It should be noted that this does not mean that these metrics for the current PCC (e.g., eNB 320) are actually outside the acceptable ranges, merely that the UE 200 is indicating the metrics are out of the range to trigger the RLF so that the UE 200 may then associate with the current SCC (e.g., the eNB 330).

Figure 5:
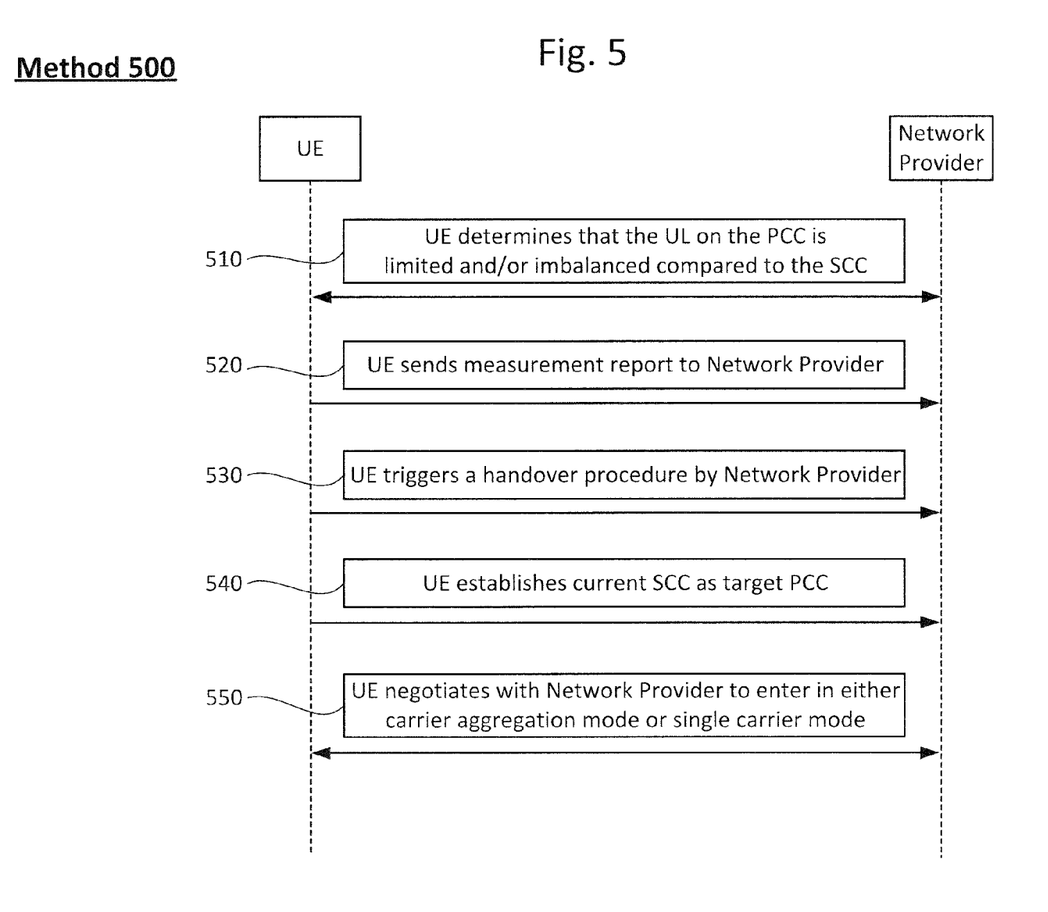
FIG. 5 shows an exemplary method for triggering an inter-frequency handover procedure to initiate the channel switch from the PCC to the SCC according to an embodiment described herein.

FIG. 5 shows an exemplary method 500 for triggering an inter-frequency handover procedure to initiate the channel switch from the PCC to the SCC. It is noted that, similar to the method 400 of FIG. 4, the entirety of method 500 may be performed by the UE 200 capable of utilizing a plurality of carrier components, such as the UE 200 including a carrier aggregation traffic mode with two or more DLs and a single UL. In addition, it will also be considered that initially, the eNB 320 is serving the PCC and the eNB 330 is serving the SCC.

In step 510, the UE 200 may determine that the UL on the PCC is poor (e.g., limited and/or imbalanced) compared to the SCC. Similar to method 400 of FIG. 4, the UE 200 may detect an imbalance in the metrics of the PCC (served by the eNB 320) when compared with metrics of the SCC (served by the eNB 330). For instance, within the DL of the PCC, the UE may detect the imbalance based on reported measurement data, such as, but not limited to RSRP, RSRQ, CQI, etc.

In step 520, the UE 200 may send a measurement report to the network provider. For instance, the UE 200 may set an offset for the DL measurements. These measurements may take into consideration the reported PHR and total radiated power ("TRP") of the SCC, as well as the imbalance metric (e.g., RSRP, RSRQ measurements) between the PCC and the SCC, to enable an inter-frequency handover.

In step 530, the UE 200 may trigger or activate a handover procedure by the network provider. For instance, the handover procedure may include the deactivation and deconfiguration of the SCC so that the UE 200 can trigger the inter-frequency handover. The SCC may be deactivated and deconfigurated upon sending the measurement reports (e.g., the RSRP, RSRQ, A6 measurements, PHR reports, the imbalance metrics, etc.). Those skilled in the art will understand that the measurements reports are used by the network provider to determine that the UE 200 should perform a handover procedure between cells because the current serving cell (e.g. PCell 320) is going to lose coverage with the UE 200. Again, the report sent by the UE 200 to the network provider does not necessarily need to be the accurate report. In other words, the UE 200 desires to switch the PCC by forcing the handover procedure. The UE 200 may report worse conditions for the current PCC than actually exist because these reported conditions will force the handover. In addition, the reported conditions may bias the current SCC (served by the eNB 330) over the current PCC (served by the eNB 320).

In step 540, the UE 200 may establish the previous SCC (served by eNB 330) as the target primary carrier component. In other words, the UE 200 may acquire the SCC as the new PCC via the initiated handover procedure and declare itself to the network provider as being capable of carrier aggregation.

In step 550, the UE 200 may negotiate with the network provider to enter in either a carrier aggregation mode or a single carrier mode. Similar to the method 400 of FIG. 4, the UE 200 may operate in either carrier aggregation mode or single carrier mode, depending upon the new RF conditions.

By utilizing the handover embodiment described above in the method 500 of FIG. 5, the UE 200 may continue to be in a connected traffic state throughout the handover process without causing any degradation in the performance metric to the service provider.

It may be noted that the exemplary embodiments are described with reference to the LTE-Advanced carrier aggregation scheme that has certain characteristics. For example, in frequency-division duplexing ("FDD"), the characteristics include that the number of aggregated carriers may be different in DL and UL, typically, the number of UL component carriers is equal to or lower than the number of DL component carriers. In addition, the individual component carriers may also be of different bandwidths. Alternatively, when time division duplexing ("TDD") is used, the number of component carriers and the bandwidth of each component carrier are the same for DL and UL. However, those skilled in the art will understand that the exemplary embodiments may be applied to any carrier aggregation scheme including those having different characteristics from the LTE-Advanced scheme.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   at a user equipment ("UE") utilizing a plurality of component carriers including a primary component carrier and a secondary component carrier:
   determining first measurement data for the primary component carrier;
   determining second measurement data for the secondary component carrier;
   detecting an imbalance between the primary component carrier and the secondary component carrier based on a comparison between the first measurement data and the second measurement data, wherein the imbalance occurs when the secondary component provides an improvement based on the comparison of the first and second measurement data over the primary component carrier;
   transmitting third measurement data to a network provider, wherein the third measurement data is related to the primary component carrier and satisfies a condition required to trigger a radio link failure ("RLF") event and wherein the third measurement data is predetermined data that is not based on actual measurements of the primary component carrier;
   declaring the radio link failure ("RLF") between the UE and a network provider, including dropping a radio resource control ("RRC") connection between the UE and the network provider;
   acquiring the secondary component carrier as a target primary component carrier;
   reestablishing with the network provider via the RRC connection; and
   operating with the secondary component carrier as the target primary component carrier.

2. The method of claim 1, wherein the imbalance is detected for a downlink based on the measurement data comprising one of a reference signal received power ("RSRP"), a reference signal received quality ("RSRQ"), or a channel quality indication ("CQI") of the primary component carrier and the secondary component carrier.

3. The method of claim 1, wherein the imbalance is detected for an uplink based on the measurement data comprising one of a maximum transmission power limit ("MTPL"), a radio frequency ("RF") scenario, or a deep fade.

4. The method of claim 1, wherein the primary component carrier is being served by a first evolved Node B (eNB) of a Long Term Evolution (LTE) network and the secondary component carrier is being served by a second eNB of the LTE network.

5. The method of claim 1, further comprising:
   indicating to the network provider, after acquiring the secondary component carrier as the target primary component carrier, that the UE is carrier aggregation capable.

6. The method of claim 5, further comprising:
   acquiring the primary component carrier as a target secondary component carrier.

7. The method of claim 5, further comprising:
   operating the UE in a single carrier mode using the secondary component carrier as a single carrier.

8. The method of claim 1, wherein the acquiring the secondary component carrier as a target primary component carrier, includes:
   performing a cell selection process ("CSP") that prioritizes the secondary component carrier.

9. The method of claim 1, wherein declaring a RLF includes:

transmitting an indication of a radio link monitoring ("RLM") metric for the primary component carrier.

10. The method of claim 9, wherein the RLM metric includes one of a Qin that is a first threshold for in synch operation or a Qout that is a second threshold for out of synch operations.

11. A method, comprising:
at a user equipment ("UE") utilizing a plurality of component carriers including a primary component carrier and a secondary component carrier:
determining that a primary component carrier is operating less optimally than a secondary component carrier;
sending a measurement report to a network provider, wherein the measurement report is related to the primary component carrier and satisfies a condition required to trigger a handover procedure for the UE and wherein the measurement report comprises redetermined data that is not based on actual measurements of the primary component carrier; and
performing the handover procedure, wherein the handover procedure establishes the secondary component carrier as a target primary component carrier.

12. The method of claim 11, wherein the determining the primary component carrier is operating less optimally than the secondary component carrier is based on an imbalance detected for a downlink based on one of a reference signal received power ("RSRP"), a reference signal received quality ("RSRQ"), or a channel quality indication ("CQI") of the primary component carrier and the secondary component carrier.

13. The method of claim 11, wherein the determining the primary component carrier is operating less optimally than the secondary component carrier is based on an imbalance detected for an uplink based on one of a maximum transmission power limit ("MTPL"), a radio frequency ("RF") scenario, or a deep fade.

14. The method of claim 11, wherein the primary component carrier is being served by a first evolved Node B (eNB) of a Long Term Evolution (LTE) network and the secondary component carrier is being served by a second eNB of the LTE network.

15. The method of claim 11, further comprising:
indicating to the network provider, after acquiring the secondary component carrier as the target primary component carrier, that the UE is carrier aggregation capable.

16. The method of claim 15, further comprising:
acquiring the primary component carrier as a target secondary component carrier.

17. The method of claim 15, further comprising:
operating the UE in a single carrier mode using the secondary component carrier as a single carrier.

18. A user equipment (UE), comprising:
a transceiver configured to connect to a network and operate in a carrier aggregation mode and a single carrier mode; and
a processor coupled to a memory, the processor executing an executable program stored on the memory, wherein the execution of the program causes the processor to perform operations comprising:
determining that a primary component carrier is operating less optimally than a secondary component carrier;
sending a measurement report to a network provider, wherein the measurement report is related to the primary component carrier and satisfies a condition required to trigger a handover procedure for the UE and wherein the measurement report comprises predetermined data that is not based on actual measurements of the primary component carrier;
initiating the handover procedure, wherein the handover procedure establishes the secondary component carrier as a target primary component carrier; and
operating with the secondary component carrier as the target primary component carrier.

19. The UE of claim 18, wherein the indication is declaring a radio link failure ("RLF") between the UE and the network, including dropping a radio resource control ("RRC") connection between the UE and the network.

20. The UE of claim 18, wherein the indication is a measurement report that indicates the primary component carrier is operating less optimally than the secondary component carrier and the measurement report triggers a handover procedure for the UE.

* * * * *

UNITED STATES PATENT AND TRADEMARK OFFICE
CERTIFICATE OF CORRECTION

PATENT NO. : 9,603,074 B2
APPLICATION NO. : 14/503220
DATED : March 21, 2017
INVENTOR(S) : Balakrishnan et al.

It is certified that error appears in the above-identified patent and that said Letters Patent is hereby corrected as shown below:

Claim 11, Column 9, Line 18 should be replaced with the following Line:
"and wherein the measurement report comprises predetermined"

Signed and Sealed this
First Day of May, 2018

Andrei Iancu
*Director of the United States Patent and Trademark Office*